United States Patent
Suprun et al.

(10) Patent No.: US 7,295,184 B2
(45) Date of Patent: *Nov. 13, 2007

(54) COMPUTER INPUT DEVICE

(75) Inventors: Anton E. Suprun, Novosibirsk (RU); Dmitri V. Simonenko, Potomac Falls, VA (US); Yuri I. Romanov, Novosibirsk (RU)

(73) Assignee: Innalabs Technologies, Inc., Dulles, VA (US)

( * ) Notice: Subject to any disclaimer, the term of this patent is extended or adjusted under 35 U.S.C. 154(b) by 309 days.

This patent is subject to a terminal disclaimer.

(21) Appl. No.: 11/070,236

(22) Filed: Mar. 3, 2005

(65) Prior Publication Data
US 2005/0140651 A1    Jun. 30, 2005

Related U.S. Application Data

(63) Continuation of application No. 10/836,186, filed on May 3, 2004, now Pat. No. 6,985,134, which is a continuation of application No. 10/209,197, filed on Aug. 1, 2002, now Pat. No. 6,731,268, which is a continuation of application No. 09/511,831, filed on Feb. 24, 2000, now Pat. No. 6,466,200.

(51) Int. Cl.
*G09G 5/06* (2006.01)
(52) U.S. Cl. ............ 345/163; 156/157; 156/164; 156/168; 156/167; 73/504.08; 73/504.17; 73/504.31; 73/514.01
(58) Field of Classification Search ........ 345/156, 345/157, 158, 163–169
See application file for complete search history.

(56) References Cited

U.S. PATENT DOCUMENTS 4,043,204 A * 8/1977 Hunter et al. ............ 73/514.08
4,601,206 A   7/1986 Watson (Continued)

FOREIGN PATENT DOCUMENTS

DE       3315958 A1    1/1984

(Continued)

OTHER PUBLICATIONS

Computer Internet Website, "*Magellan 3D Controller*" (also known as Space Mouse), by Logicad, a Logitech Company, address "http://www.qualixdirect.com/html/magellan.html", 2 pages.

(Continued)

*Primary Examiner*—Richard Hjerpe
*Assistant Examiner*—Jennifer T Nguyen
(74) *Attorney, Agent, or Firm*—Bardmesser Law Group

(57) ABSTRACT

A computer input device includes a magnetized fluid and an inertial body within the magnetized fluid. A signal converter provides angular acceleration information based on behavior of the inertial body. The computer input device can be attached to a Virtual Reality Suit, or can be used to control computer-generated graphical objects. The inertial body can be non-magnetic. The body can be solid or hollow. Electromagnets and/or permanent magnets can be used for magnetizing the fluid. Magnetic coils sense the changes in the magnetic flux lines. Signals from the magnetic coils are used by the signal converter to calculate the angular acceleration. A housing encloses the magnetized fluid and the inertial body.

22 Claims, 4 Drawing Sheets

U.S. PATENT DOCUMENTS

| | | | |
|---|---|---|---|
| 4,711,125 A | | 12/1987 | Morrison |
| 4,922,444 A | * | 5/1990 | Baba .......................... 702/150 |
| 4,984,463 A | | 1/1991 | Idogaki et al. |
| 4,991,438 A | * | 2/1991 | Evans ...................... 73/514.08 |
| 5,007,292 A | * | 4/1991 | Crowe et al. .................. 73/654 |
| 5,181,181 A | | 1/1993 | Glynn |
| 5,774,113 A | | 6/1998 | Barnes |
| 5,831,553 A | | 11/1998 | Lenssen et al. |
| 5,835,077 A | | 11/1998 | Dao et al. |
| 5,982,169 A | | 11/1999 | Furlani et al. |
| 6,002,184 A | | 12/1999 | Delson et al. |
| 6,128,006 A | | 10/2000 | Rosenberg et al. |
| 6,154,199 A | | 11/2000 | Butler |
| 6,369,794 B1 | | 4/2002 | Sakurai et al. |
| 6,466,200 B1 | * | 10/2002 | Anton et al. ................. 345/163 |
| 6,501,458 B2 | | 12/2002 | Baker et al. |
| 6,509,888 B1 | | 1/2003 | Tuovinen et al. |
| 6,731,268 B2 | * | 5/2004 | Anton et al. ................. 345/163 |
| 6,985,134 B2 | * | 1/2006 | Suprun et al. ............... 345/163 |
| 7,061,469 B2 | * | 6/2006 | Suprun et al. ............... 345/158 |
| 2002/0003527 A1 | | 1/2002 | Baker et al. |
| 2002/0054011 A1 | | 5/2002 | Bruneau et al. |
| 2003/0063068 A1 | * | 4/2003 | Anton et al. ................. 345/158 |
| 2004/0095317 A1 | | 5/2004 | Zhang et al. |
| 2004/0140962 A1 | | 7/2004 | Wang et al. |
| 2004/0201570 A1 | * | 10/2004 | Anton et al. ................. 345/156 |
| 2005/0001814 A1 | * | 1/2005 | Anton et al. ................. 345/158 |

FOREIGN PATENT DOCUMENTS

| | | |
|---|---|---|
| JP | 62-163972 | 7/1987 |
| JP | 02-205775 | 8/1990 |
| JP | 04-344467 | 12/1992 |
| JP | 06-213921 | 8/1994 |
| RU | 2168201 | 11/1999 |
| RU | 2166203 | 1/2000 |
| RU | 2173882 C1 | 3/2000 |
| RU | 2201618 C2 | 3/2001 |

OTHER PUBLICATIONS

Computer Internet Website, "Logitech 3D Mouse Logitech Head Tra", by Fakespace, Inc., address "http://www.qualixdirect.com/html3d_mouse_and_head_tracker html", 2 pages.

Computer Internet Website, "The Spaceball 3D Controller", by Spacetec IMC Corporation, address "http://www.qualixdirect.com/html/spacebal.html", 3 pages.

English Translation Abstract to RU 2201618 C2 (AL1).

English Translation Abstract to RU 2173882 C1 (AM1).

English Translation Abstract to RU 2166203 C1 (AN1).

English Translation Abstract to RU 2168201 C1 (AO1).

English Translation Abstract for DE 3315958 A1, 1 page, supplied from the esp@cenet database.

"IEEE Recommended Practice for Precision Centrifuge Testing of Linear Accelerometers", IEEE Standards 836-2001, The Institute of Electrical and Electronics Engineers, Inc., Nov. 7, 2001, pp. i-86.

"IEEE Specification Format Guide and Test Procedure for Two-Degree-of-Freedom Dynamically Tuned Gyros", ANS/IEEE Std 813-1988, The Institute of Electrical and Electronic Engineers, Inc., 1989, pp. i-91.

Bashtovoi, V.G. et al. "Introduction to Thermomechanics of Magnetic Liquids", High Temperature Institute of the Academy of Sciences of the USSR, Moscow, 1985 (partial translation of p. 13).

"IEEE Standard Specification Format Guide and Test Procedure for Nongyroscopic Inertial Angular Sensors: Jerk, Acceleration, Velocity, and Displacement", IEEE Std 671-1985 (R2003), The Institute of Electrical and Electronics Engineers, Inc., 1985, pp. Iil-69.

Notification of Transmittal of The International Search Report And The Written Opinion Of The International Searching Authority, Or The Declaration, from PCT Application No. PCT/US04/15924, 8 pages, mailed Dec. 9, 2004.

English Translation Abstract for DE 3315958 A1, 1 page, supplied from the esp@cenet database.

English Translation Abstract for RU 2201618 C2, 1 page.

English Translation Abstract for RU 2173882 C1, 1 page.

English Translation Abstract for RU 2166203 C1, 1 page.

English Translation Abstract for RU 2168201 C1, 1 page.

Computer Internet Website, Magellan 3D Controller (also known as Space Mouse), by Logicad, a Logitech Company, address "http://www.qualixdirect.com/html/magellan.html", 2 pages.

* cited by examiner and trackball. Such input devices contain a trackball that generates a signal which corresponds to a position angle and two covers. A positioner is typically located between the covers in a such manner that it is only partially raised behind the covers. One of the covers is hinged and is able to move between a closed and open position. A retainer is used to hold the covers in a position that ensures that the positioner is held against a flat surface. A second retainer is typically used to hold both covers in such location and manner that the surface of the positioner is supported by two surface and in contact with the flat surface.

COMPUTER INPUT DEVICE

CROSS-REFERENCE TO RELATED APPLICATIONS

This application is a continuation of U.S. patent application Ser. No. 10/836,186, filed on May 3, 2004, now U.S. Pat. No. 6,985,134 which is a continuation of U.S. patent application Ser. No. 10/209,197 filed on Aug. 1, 2002, now U.S. Pat. No. 6,731,268 which is a continuation of application Ser. No. 09/511,831, filed on Feb. 24, 2000, now U.S. Pat. No. 6,466,200 which claims priority to Russian patent application No. 99122838, filed Nov. 3, 1999, all of which are incorporated herein by reference in their entirety.

BACKGROUND OF THE INVENTION

Computer input devices for the input of coordinates and graphic information in a computer typically utilize a mouse and trackball. Such input devices contain a trackball that generates a signal which corresponds to a position angle and two covers. A positioner is typically located between the covers in a such manner that it is only partially raised behind the covers. One of the covers is hinged and is able to move between a closed and open position. A retainer is used to hold the covers in a position that ensures that the positioner is held against a flat surface. A second retainer is typically used to hold both covers in such location and manner that the surface of the positioner is supported by two surface and in contact with the flat surface.

The disadvantage of these devices is that it they are limited to controlling only two coordinates, X and Y. Additionally, the device typically requires a special work surface for the device movement, and the parts and assemblies for the device must be manufactured to precise mechanical specifications. Furthermore, the device may easily fail as a result of wear and dust accumulation on the moving parts.

Graphic positioners that provide input for 3 independent coordinates, X, Y, and Z, typically consist of a base with two perpendicular shafts rotating in sets of bearings and a third shaft that is mounted on a bezel in a bearing assembly. Each shaft is mated to a coder that translates the shaft rotation into code. The code is supplied through a cable to the computer in order to control a graphic object on a display.

This device is also limited to controlling one pair of coordinates at a time, (XY), or (XZ), or (YZ). Furthermore, the device typically provides an uncomfortable position for the operator's wrist and a rigidly limited area in which the operator's hand must be located during the manipulations (determined by the shaft's length, where shaft is fixed in a holder and on a base). In addition, the device contains of parts that are difficult to manufacture and are prone to excessive wear due to friction.

Another type of controller for providing three-dimensional input data is a device that has a coordinating handle. This controller typically contains a spheroid inside a stationary casing which freely rotates in all directions. Attached to the spheroid is a handle that can be rotated and moved in any direction. The device also contains inner and outer leverage plates that are attached by hinges to the casing. These leverage plates typically align at intersection planes and rotate simultaneously with the handle. Two angle converters are attached to the casing and driven by rotation of the plate. The rotational angle converter is also typically driven by the handle rotation. Depending on the axial movement of the handle, the rotational angle converter is typically connected or disconnected from the handle by a coupling clutch installed between them. The handle rotation produces electrical signals on the device's output.

The disadvantage of this type of controller is the complex design of the rotating handle. A large number of parts and assemblies require precision machining. Further, a large number of parts are susceptible to wear which will reduce the life of the device.

Another type of input device is a computer-input pen designed for input of handwritten information. The pen consists of a hollow casing with a writing element having acceleration and pressure sensors. Typically, the acceleration and pressure sensors are mutually perpendicular piezoelectric plates with inertial elements that are placed along the axis of the writing element in two rows. The upper row consists of inertial sensors attached to the lower edges of the piezoelectric plates. These piezoelectric plates are typically parallel to the axis of the writing element. One edge of the piezoelectric plates is rigidly attached to the casing while the other edge is attached to the writing element through the spring-loaded rod. This device only allows for two-dimensional coordinate input of information into computer.

There is a need for a data input device that is easy to manufacture can provide manipulations in six degrees of freedom, and is capable of gradual adjustment.

SUMMARY OF THE INVENTION

The present invention is directed to electronic and computational equipment and more particularly is directed to a data input device used to input of coordinates, three-dimensional graphic information and commands, into a computer.

In accordance with one embodiment of the present invention, an input device is provided that allows provides for manipulation in six degrees of freedom, and increases reliability, manufacturability, and capability of gradual adjustments.

Accordingly, one embodiment of the present invention includes a data input device comprising an acceleration sensor having a data output and a connection between the data output and a computer for transferring data between the input device and a computer. The acceleration sensor includes a closed volume vessel containing magnetic fluid and a non-magnetic inertial body contained in the vessel. There are at least three magnetic field sources located around the acceleration sensor on three substantially perpendicular axes, wherein each magnetic field source has a data output for connection to the computer.

Further the device of the present invention includes a signal converter assembly and switches wherein the outputs of the magnetic field sources are connected to inputs of the signal converter assembly. Additional inputs of the signal converter assembly are connected to outputs of switches. The inputs and outputs of the signal converter assembly are inputs and outputs of the device which are connected to the computer.

The acceleration sensor closed volume vessel may be sphere shaped or a centrally, symmetrical shaped polygon. The inertial body may be sphere shaped or a centrally symmetrical shaped polygon. The inertial body may be hollow. Further, the inertial body may be made out of two or more non-magnetic materials.

The present invention also includes magnetic field sources that have a plurality of serially connected current generators and inductor coils, wherein the magnetic field source is a current generator output.

Further, the invention includes several additional magnetic field sources introduced into the proximity of the magnetic field sources, where outputs of the additional magnetic field sources are not connected. The additional magnetic field sources may include several interconnected inductor coils. Still further, one or more constant magnets may be added to the magnetic field source.

Additionally the present invention may include a signal converter assembly that includes an analog to digital converter (ADC), a counter, a serial interface, a level converter and input register, wherein the ADC output is connected through a bi-directional bus to the counter and the input register and the serial interface, wherein the serial interface input and output are connected correspondingly to the output and input of the level converter, and wherein the level converter output and input is an output and input for the device.

The invention may also include a signal converter assembly where the ADC output is connected to an analog output of the signal converter assembly, which connects to inputs of the magnetic field sources, and wherein the ADC is connected by a bi-directional bus to the counter and inputs of the magnetic field source.

Still further, the present invention includes a communication cable for connecting the output of the device to the computer. The acceleration sensor may also be housed in a case.

Additionally the present invention includes an input device where the acceleration sensor and switches are inside a case, and the converter assembly is located in the computer, where the connection with the computer is provided through the multicore cable which then connects the acceleration sensor and switches outputs to the corresponding inputs of signal converter, and where the signal converter output is connected directly to the computer.

Further, the invention includes an input device where the case is compact and fits in the operator's palm and wherein the acceleration sensor is located in the case of the device in such a manner that an X axis of the sensor is directed forward, a Y axis to the right, and a Z axis the top direction relative to the operator, and where the switches are placed under the operator's fingers. The switches may be located in a separate case, and the switches output may be connected to the converter assembly by a multicore cable.

The present invention also includes a device where the case of the device is stationary and the inertial body is movable relative to the case and where the acceleration sensor is mechanically connected to control devices that are located on the three mutually perpendicular axis.

Further, the present invention may include additional acceleration sensors that are added to the device and where additional inputs are added to the signal converter assembly for each of the additional acceleration sensors.

Still further, the present invention includes a device that has a connection with the computer through radio waves. The connection with the computer may occur through a bi-directional channel.

DETAILED DESCRIPTION OF THE INVENTION

Figure 1:
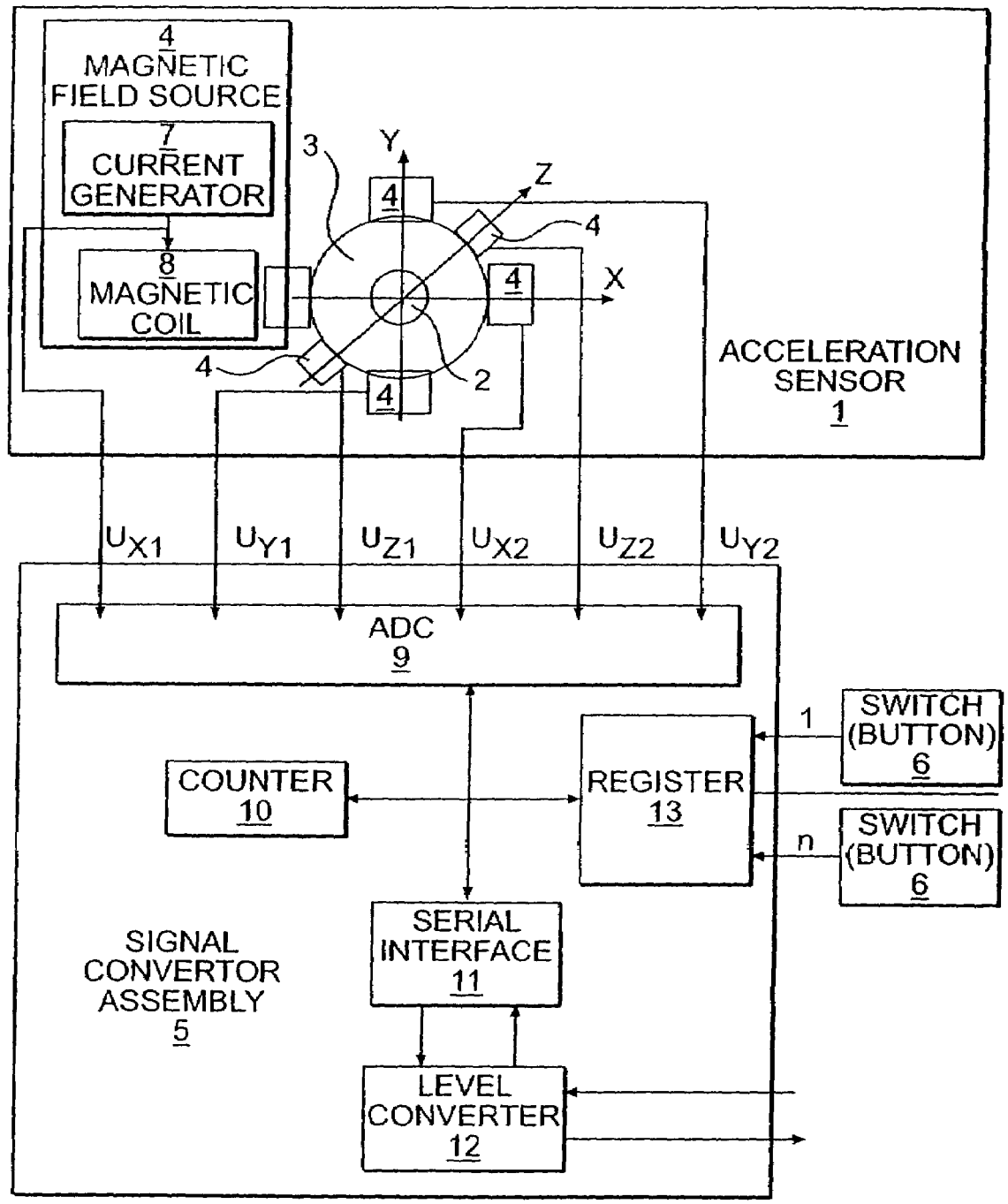
FIG. 1 is a diagrammatic view of an input device in accordance with the present invention.

In accordance with the present invention, an input device is provided that allows for manipulation in six degrees of freedom. Further, the invention provides increased reliability and manufacturability. Still further, the invention provides the capability of gradual adjustments.

Briefly summarized, one embodiment of the present invention includes an input device having an acceleration sensor housed in a casing with a communication line to connect the device to computer. The acceleration sensor is a symmetric inertial body made of non-magnetic material that is placed in a closed volume of magnetic fluid. Three couples of magnetic field sources are located around the non-magnetic inertial body on mutually perpendicular axes. The device is equipped with signal converters and switches where outputs of magnetic field sources are connected to analog inputs of an analog to digital converter and outputs of the analog to digital converter are connected to the signal converter inputs. Additionally, serial inputs and outputs of the signal converter are used for output and input connectors for the computer.

The proposed computer input device allows for manipulation of the object independently in six degrees of freedom, represented by three linear $a=\{a_x, a_y, a_z\}$ and three angular $\Psi=\{\Psi_x, \Psi_y, \Psi_z\}$ acceleration components. Reliability of this computer input device is increased by the absence of mechanical contact between its parts.

The device is easy to manufacture due to the low precision requirements of the dimensions of the acceleration sensor, low precision of the current generator adjustments, and the use of printed circuit technology for manufacturing the electrical magnets, as well as overall low number of parts.

Gradual adjustment of sensitivity can be arranged either through adjustment of current levels on electrical magnets or by changes of the magnetic field source proximity. In either case there is no need to replace parts in the device. It is also possible to arrange for the adjustment from the software setting from the computer.

An embodiment of the proposed computer input device with an acceleration sensor is based on the properties of the magnetic fluid. Expulsive forces are developed around a non-magnetic body immersed in magnetic fluid. The potential and distribution of the magnetic field lines in the magnetic fluid determine the direction and magnitude of such expulsive force. (S. V. Rulev, V. N. Samsonov, A. M. Savostianov, G. K. Shmyrin, "Controlled Vibroinsulators with Magnetic Fluid," MO USSR, M., 1988, pages 17-21).

Therefore, the magnetic fluid should be viewed relative to the body made of the non-magnetic material as an environment which the effective density is increased proportionately to the increase of the magnetic field force.

The magnetic fluid may be a two-phase system that possesses both flowability and high sensitivity to an applied magnetic field, and acts as a quasi-elastic object when magnetized. The particle size of the solid phase of the mixture in one embodiment may be about $1\times10^{-9}$ meters. One type of suitable magnetic fluid is a low viscosity dispersion of magnetite or loadstone in kerosene, having a density between about 1.1 and about 1.5 grams/cubic centimeter. The kerosene dispersion has an effective viscosity between about 0.005 and about 0.1 PAs and has a magnetizability under a 250 kA/m magnetic field between about 30 and about 50 kA/m. Another suitable magnetic fluid is a low viscosity dispersion of magnetite in liquid organic silicone having a density between about 1.1 and about 1.5 grams/cubic centimeter. The silicon dispersion has an effective viscosity below about 0.7 PAs and has a magnetizability under a 250 kA/m magnetic field of about 25 kA/m. Further, a magnetoreactic suspension of dispersed ferromagnetic matter in liquid organic silicone may serve as a suitable magnetic fluid. The magnetoreactic suspension has a density between about 3.4 and about 4.0 grams/cubic centimeters, a friction of factor of about 0.1 to about 0.2, and a wear rate between about $2 \times 10^{-7}$ and about $8 \times 10^{-7}$.

The acceleration sensor is a closed volume vessel, such as a sphere or a centrally symmetrical polygon, filled with magnetic fluid. The magnetic field is then created inside the vessel in such a manner, that forces increase from the center of the volume. In order to configure the magnetic field in the described manner, three pairs of magnetic field sources (electromagnetic coils) are attached to the sensor surface on three perpendicular axes. Additional sources of a magnetic field, such as electrical or constant magnets may be introduced in the design in order to simplify the devices manufacturing by allowing the electrical magnets to be manufactured as printed circuits and/or reduce the power consumption by replacing some of the electrical magnets by constant magnets.

A symmetrically shaped inertial body, such as a sphere or a centrally symmetrical polygon, made of non-magnetic material such as plastic or plexiglas is placed into the magnetic fluid. The shape of the inertial body may be spherical or a centrally symmetrical polygon. Further, the inertial body may be hollow. The inertial body may consist of two or more non-magnetic materials. The inertial body may have a density close to that of the selected magnetic fluid.

Due to the radial gradient of the magnetic field force, the effective density of the magnetic fluid increases in the direction from the center of the acceleration center. Therefore, the inertial body is being pushed toward the equilibrium point which is close to the geometric center of the acceleration sensor.

After the acceleration sensor is moved, the inertial body, being in transitional state, is moved away from the equilibrium center, which in turn leads to the change in thickness of magnetic fluid located underneath each electric magnet (each coil). The image impedance of the electric magnet (each coil) will change accordingly. The impedance change leads to a change of voltage on the electrical magnets (coils), where amplitudes of the potential will change to antiphase on the coils on which the axis force is applied to the acceleration sensor. After the movement of the sensor, the differential of the current (amplitude) variable component increases in each couple of coils and is proportional to the acceleration applied to the corresponding axis. It is the possible to describe the movement of the sensor along any space trajectory.

When the sensor is being rotated along the axis, the magnetic fluid acts as an inertial body, which moves in the magnetic field. The magnetic field is inhomogeneous in the direction of the rotation. Acceleration in the flow of the magnetic fluid resulting from the rotation leads to a change in impedance in the electric coils for these coils along which the magnetic fluid is moving. Such change in impedance, which results from a loss of magnetic field energy to reversal magnetization of moving magnetic fluid, leads to in-phase change coils voltage. The magnitude of the voltage change is proportionate to angular acceleration of the acceleration sensor. Therefore, the magnitude of the voltage change is used to describe the axial rotation of the acceleration sensor at any axis.

The device of the present invention provides for independent sensing of movement along three spatial and three angular degrees of freedom. The device output signal contains information about six independent degrees of freedom.

Reliability of the device is increased by the absence of the contacting mechanical parts and ease of manufacture is increased by the absence of the requirements for precision machining of the acceleration sensor parts. Many of the parts may be manufactured by injection molding from plastic. Electrical magnets may be manufactured by the printed circuit technology in order to eliminate need for coiled parts to further simplify the device manufacturing.

Sensitivity adjustment of the input device may be achieved by changing the medial potential of the magnetic field in the magnetic fluid. A change in the magnetic field can be either due a to change of current in the coils or a change in proximity of the magnetic field sources from the surface of the acceleration sensor.

The proposed input device may be used for input of coordinate information, graphical information and controlling computer generated objects, which may be valuable in such computer applications as computer games and 3-dimensional designs, etc., and as a substitute for a mouse, keyboard or the like.

With reference now to FIG. 1, there is shown a skeleton diagram of an embodiment of the input device in accordance with the present invention. The following symbols are used: $U_{x1}$, $U_{x2}$—voltages on the acceleration sensor output that corresponds to the X axis; $U_{y1}$, $U_{y2}$—voltages on the acceleration sensor output that corresponds to the Y axis; $U_{z1}$, $U_{z2}$—voltages on the acceleration sensor output that corresponds to the Z axis.

Figure 3:
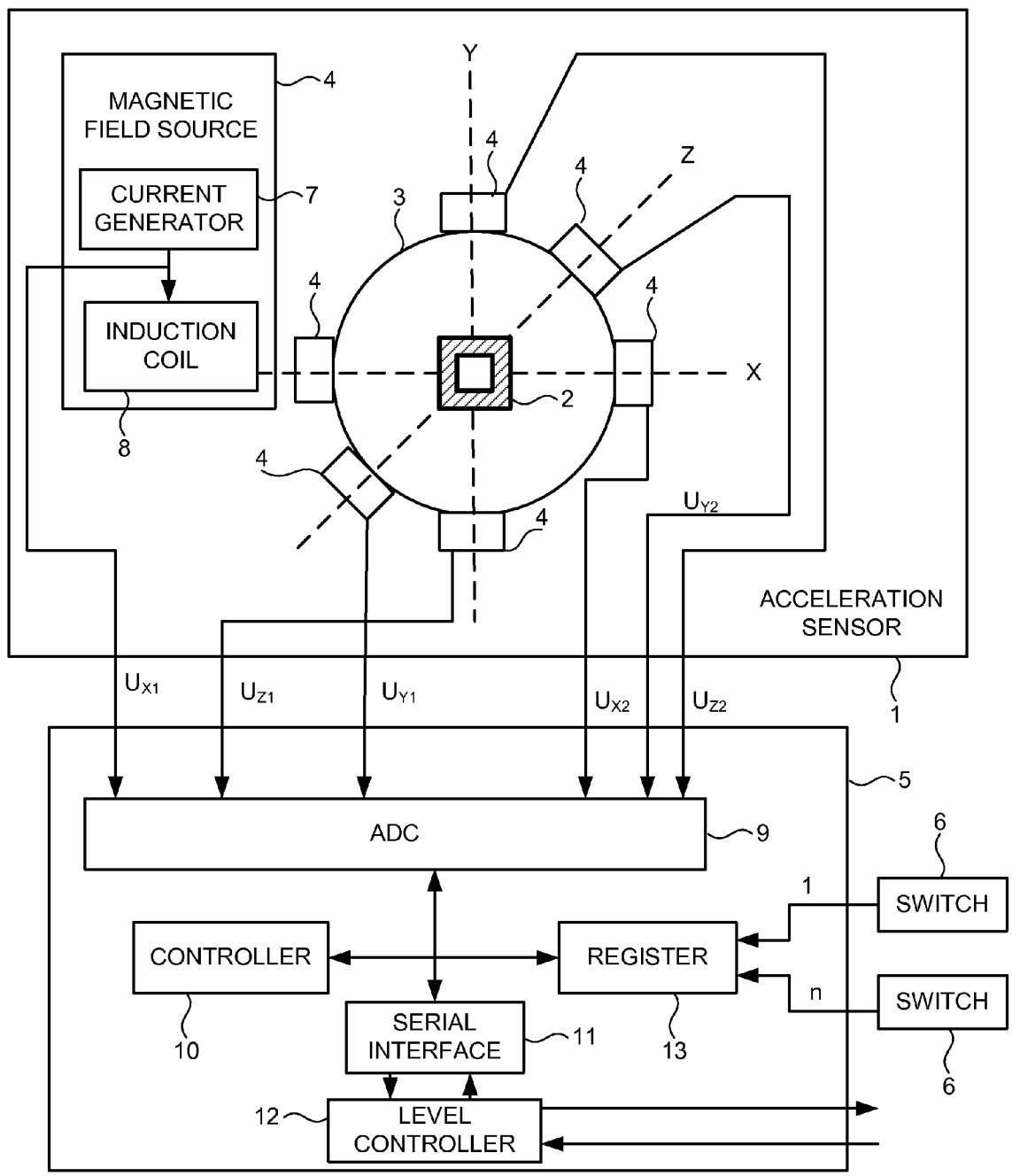
FIG. 3 is a diagrammatic view of an input device in accordance with the present invention with a hollow inertial body.

The computer input device contains an acceleration sensor (1) that consists of symmetrical inertial body in the shape of a sphere (2) that is made from a non-magnetic material (e.g., plastic or Plexiglas) and is placed in a closed volume filled with magnetic fluid (3). (Alternatively, the inertial body may have other shapes, such as a cube, and/or be hollow, see FIG. 3. The shape of the inertial body should, obviously, correspond to the number of degrees of freedom of the acceleration being measured.) Three pairs of magnetic field sources (4) are located in pairs around the vessel with the magnetic fluid (3) (not all are shown in the figures), on mutually perpendicular axis. A signal converter assembly (5) and switches (6) are provided where the magnetic field source is serially connected to current generator (7) and induction coil (8), and where the current generator output is connected to the input of the magnetic field source (4). Moreover, signal converter assembly (5) contains a six-channel ADC (9), a counter (10), a serial interface (11), a level converter (12) and an input register (13), where the input register inputs are digital inputs of the signal converter assembly (5) and analog inputs of the signal converter assembly (5) are inputs of the ADC (9). The ADC output is connected through bi-directional bus with the counter (10), input register (13) and serial interface (11), the input and output of which are correspondingly connected to the output and input of the level converter (12). The output and input of the level converter is the device output and inputs. The outputs of the acceleration sensor (1) are connected to the analog inputs of the signal converter assembly (5), and the digital inputs are connected to the switches (6), where one of the switches is employed as an indicator of the operator activity and remaining switches are used by the operator to control the software on the computer.

Analog outputs of the signal converter (5), which are outputs of a six channel DAC (14), are connected to the control terminals of the magnetic field sources (4), which are inputs of the current generator (7). Digital inputs to the DAC (14) are connected by a bi-directional bus with the counter (10).

Various designs of adjustable voltage current generator (7) on transistors or operational amplifier IC are described in P. Horovitz, W. Hill "The Art of Circuit Engineering," 3 volumes, published in Moscow by Mir in 1993, herein incorporated by reference in its entirety.

The signal converter (5) may be based on MC68HC05B6 chip, with serial input and output connected correspondingly to the output and input of the level converter, which can be designed around ADM203 chip. MC68HC05B6 is an 8-bit single chip microcontroller that contains HC05 microprocessor core, 6 Kbyte ROM, 176 byte RAM, 8-channel, 8-bit ADC with built-in reference voltage generator, multipurpose timer, clock generator which requires external quarts resonator and passive filter, and RS-232 serial interface. Connection diagram and detailed description of this microcontroller can be found in "MC68HC05B6 Technical Data," Rev. 3 (1995).

An AD7228A chip may be used as a 6-channel DAC in signal converter assembly. The AD7228A has a built-in reference voltage generator, and requires single +5V power source.

To create additional analog inputs in the signal converter assembly, one or more AD 7828 chips may be employed as a 8 channel, 8-bit ADC. They require a +5V power source and a filtered +5V power source may be used as reference voltage.

Technical specifications of AD7228A and AD 7828 may be found in 1996 Short Form Designer Guide, Analog Devices (1996).

The ADM203 chip has two channels of logical signal converter with 0 and +5V levels in RS-232 signals ands two converter channels from RS-232 into 0 and +5V logical signals. No passive elements are required. Technical specifications and connection diagrams of ADM203 chip may be found in ADM2XXL Family for RS-232 Communications, Rev. 0 (1994).

In accordance with the present invention, the magnetic field sources are serially connected to a current generator and induction (magnetic) coil, where the current generator output is connected to the input of the magnetic field source. In order to simplify the device's manufacturing, additional sources of the magnetic field may consists of several interconnected coils. In order to reduce power consumption, one or more constant magnets may be added to the source of magnetic field. Further, several additional magnetic field sources may be introduced in the device. The outputs from these additional sources are typically not connected.

The present invention may contain a signal converter assembly that contains the ADC, counter, serial interface, level converter and input register. The signal goes to the ADC input and the output is connected through bi-directional bus to the counter, input register and serial interface. The serial interface input and output is connected correspondingly to the output and input of the level converter. The level converter output and input is also an output and input for the device.

To provide for gradual sensitivity adjustment by computer software, DAC is added to the converter assembly. The DAC output is connected to the analog output of the signal converter, which connects to control inputs of the magnetic field sources. The DAC is connected by a bi-directional bus to the counter. The control input of the magnetic field source is the control input for the current generator.

The acceleration sensor and switches are typically inside the case for the device, but the converter assembly may be located in the computer where the connection to the computer is provided through a multiple conductor wire cable to connect output from the acceleration sensor and switches outputs to the corresponding inputs of the signal converter. The signal converter output is typically connected directly to the computer.

Additional acceleration sensors (the number of such is denoted by the letter "m") may be added in order to be placed on the moving object, where 6.times.m analog inputs are added to the signal converter assembly. Such modifications would allow the device to be used for Virtual Reality suits, for robot training, or may be placed on an object for investigation of its destructive deformation (as in a car crash test).

Figure 2:
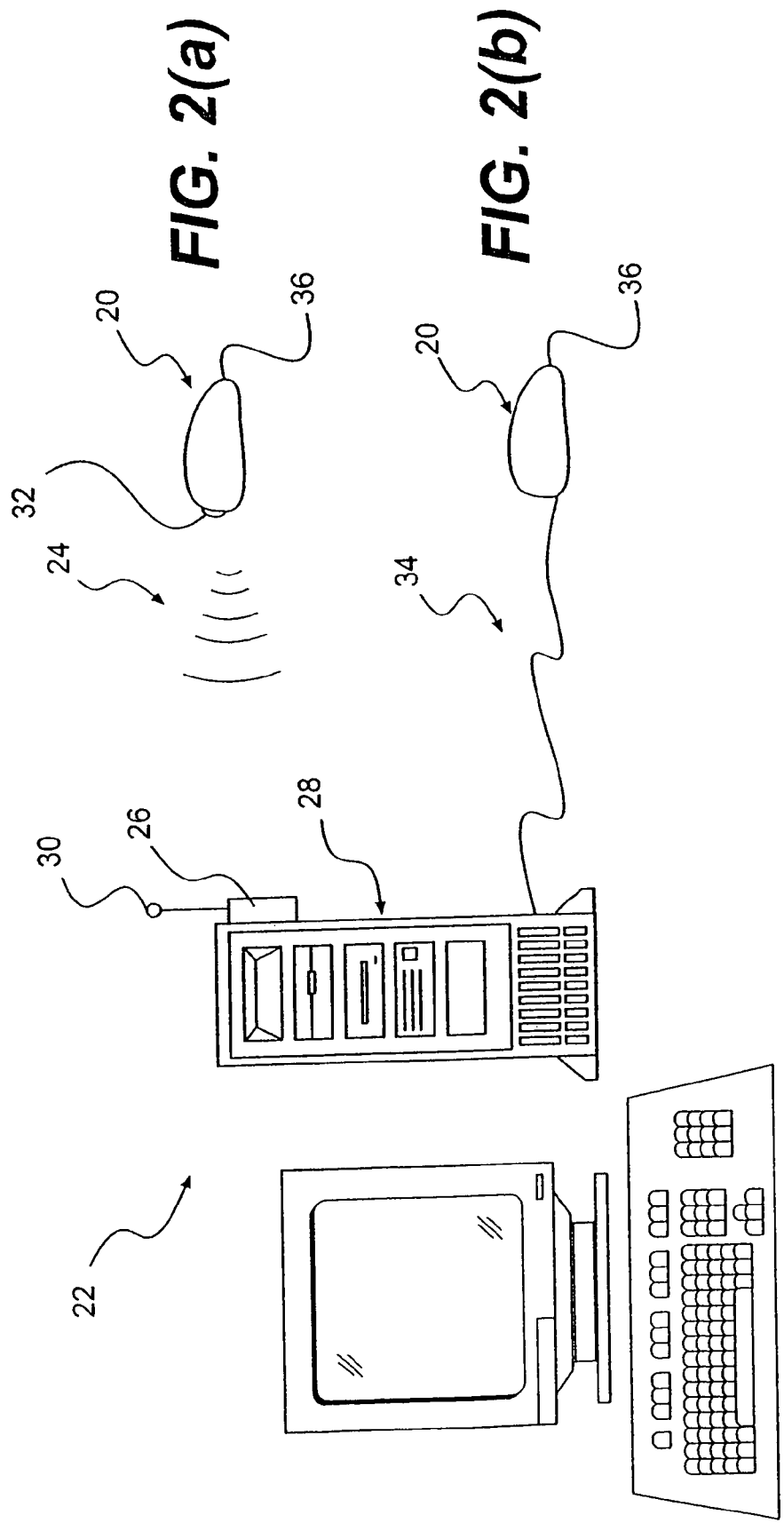
FIG. 2 is a diagrammatic view of an input device in accordance with the present invention with a) a radio communication connection to the computer and b) a cable connection to the computer.

With reference now to FIG. 2 and continuing reference to FIG. 1, there is shown the device of the present invention 20 connected to the computer 22 by a) radio waves 24 or b) by a cable 34.

In one embodiment, a case 36 may be provided to house the acceleration sensor where the case of the device is stationary and the inertial body is movable relative to the case. The acceleration sensor may be mechanically connected to the control device and is located on the three mutually perpendicular axes. The acceleration sensor is located in the case of the device in a such manner that the X axis of the sensor is directed forward, the Y axis to the right, the Z axis to the top, and the sensor is placed under operators fingers. The case of the input device should be compact and able to fit in the operator's palm.

The switches may be located in a separate case, where the switch output is connected to the converter assembly by multiple conductor wire cable. The number of the installed switches is determined by the required capabilities, where one of the switches is employed as an indicator of the operator action.

As mentioned above, the communication between the input device 20 and the computer 22 can occur by radio waves 24. Typically a radio receiver 26 is located with the computer 22 either inside or outside the computer case 28, where a radio receiver output is connected to the computer through an interface device that ensures matching of the computer to the receiver's output. A receiving antenna 30 is located on the computer case 28. The device 20 has another antenna 32 that is connected to the transmitter output associated with the device. A rechargeable battery may be placed in the device case. The recharging contacts of the battery may be on the outer surface of the case and connected to the power supply inputs of the transmitter and converter assembly. The output is typically connected to the input of the transmitter. The radio communication link with the computer typically occurs through a bi-directional channel.

The input device works in the following way:

While the device is not in motion, the non-magnetic inertial body (2) is located near the center of the magnetic fluid filled vessel (3) of the acceleration sensor (1). This position of the inertial body creates a magnetic field in the magnetic fluid (3). The intensity of the magnetic field increases away from the center of the vessel of the acceleration sensor (1), which ensures positive gradient of effective density of the magnetic fluid (3) that is also directed away from the sensor center. Therefore the inertial body (2), not being influenced by the magnetic field, is displaced to the point of lowest effective density of the magnetic fluid (3), to the proximity of the geometrical center of the magnetic fluid (3) filled volume of the acceleration sensor (1). A symmetric (e.g., sphere) shaped inertial body that is enclosed in magnetic fluid filled volume ensures approximate equal thickness of the magnetic fluid between the inertial body and the sources of magnetic field (4). The magnetic field source consists of the current generator (7) and coil (8). In order to measure reactance (imaginary impedance) of the coils, the current generator (7) output contains an alternating current component. The amplitude of the alternating component for each generator is less than the DC component (in the design version with constant magnets generator output may entirely consists of alternating component to reduce power consumption). The amplitudes of alternating component for each current generator (7) are approximately equal. Reactance (imaginary impedance) of the magnetic field sources (4) is approximately equal due to the equal distance of the magnetic fluid thickness between each of the coils and inertial body. In the stationary state of the device, the amplitudes of the alternating component on the acceleration sensor (1) output are approximately equal. Acceleration sensor (1) sensitivity adjustments are achieved by changing the medial level of magnetic field in the magnetic fluid (3). The change can be made by changing the DC component magnitude on the current generator (7) or by decreasing/increasing of their proximity from the center of the accelerator sensor (1). A change in the DC component may be controlled by a computer through the input of the device by changing the voltage on the DAC (14) output and therefore controlling the current generator (7). There are two ways to adjust the accelerator sensor. First, the acceleration sensor may be adjusted independently from the computer software by changing the proximity of the magnetic field sources (4) relative to the center of the acceleration sensor (1) or by manually changing the DC component of the current generators (7). Second, the acceleration sensor may be adjusted by computer commands which change the voltage on the analog outputs of the signal converter (5).

The inertial mass (2) damping coefficient of the magnetic fluid changes as a result of moving away from an equilibrium state. The damping coefficient determines the amplitude (gain)-frequency response by the magnitude of the inertial mass (2) displacement from the equilibrium state under a specified acceleration level applied to the acceleration sensor (1). Therefore the range of the magnetic fluid thickness change is being measured relatively to each of the magnetic field sources (4), which is in turn determines the range of reactance change on the coil (8). Thus the adjustment of change in the amplitude of the alternating component on the outputs of the acceleration sensor (1) takes place. In order to match the dynamic range changes in output voltage of the acceleration sensor (1) to the fixed range of the ADC microcontroller in the signal converter assembly (5), it may be necessary to serially connect a six channel AC amplifier on the inputs of the ADC microcontroller. Such an amplifier may be designed as an active filter. In order to reduce precision machining requirements to the assemblies and parts of the acceleration sensor (1) and to provide for adjustable amplifier channels in ADC (9), factual voltages on the acceleration sensor in the stationary state may be recorded into a counter (10) after being converted into the digital state by the ADC (9).

Input data from the device to the computer may occur as follows: when the switch indicating operator activity is engaged, and movement of the device by the operator's hand caused acceleration along the X axis, the inertial body (2) will move to the left from the equilibrium position and the thickness of the magnetic fluid (3) under the left coil will decrease and under three right coils on the X axis will increase. This will lead to a reversed phase voltage change in AC component on the sensors output that corresponds to the X axis. Signals from the acceleration sensor (1), after being digitized by the ADC (9) directed to the counter (10), where X axis acceleration is estimated as follows:

$$a_x = k \times [(U_{x1} - U_{x1}^0) + (U_{x2} - U_{x2}^0)], \quad \text{(Formula 1)}.$$

In Formula 1, k is a factor determined by the geometric dimensions of the acceleration sensor (1) and the magnetic fluid (3) properties under a constant magnitude of the magnetic field DC component in the magnetic fluid (3), and under a specified average current of the current generator (7);

$U_{xi}$ is the current amplitude of the AC component on the "i" number of output terminal of acceleration sensor (1), which corresponds to the X axis; and $U_{xi}^0$ is the amplitude of the AC component on the "i" number of output terminals of the acceleration sensor (1), which corresponds to the X axis in the stationary state of the device.

Acceleration components $a_y$ and $a_z$, which correspond to the Y and Z-axis are determined in the manner consistent with Formula 1.

In the case of the rotation around the X axis, the role of the inertial body is taken by the magnetic fluid (3), which is moving relative to the magnetic field sources (4) that are located on the Y and Z axis. The magnetic field is inhomogeneous in direction of the rotation. The movement of the magnetic fluid (3) leads to a reversal magnetization, on which the energy of the magnetic field is used. Therefore, during the rotation of the accelerator sensor (1) around the X axis, reactivity of the coils (8) that are part of the magnetic field sources (4) on the Y and Z axis will change, which will lead to the change in the amplitudes of the current's AC component on the accelerator sensor (1) outputs that corresponds to the axis Y and Z.

Amplitudes of the AC component on the output of the acceleration sensor (1), transferred by ADC (9) into a digital signal, are supplied to the counter (10) where rotational acceleration around the X axis is estimated as follows:

$$\Psi_x = K \times [(U_{y1} - U_{y1}^0) + (U_{y2} - U_{y2}^0) + (U_{z1} - U_{z1}^0) + (U_{z2} - U_{z2}^0)], \quad \text{(Formula 2)}$$

In Formula 2, K is factor determined by the geometric dimensions of the acceleration sensor (1) and the magnetic fluid properties (3) under a constant magnitude of the magnetic field DC component in the magnetic fluid (3), and under a specified average current of the current generator (7);

$U_{yi}$ is the current amplitude of the AC component on the "i" number of output terminals of the acceleration sensor (1), which corresponds to the Y axis;

$U_{zi}$ is the current amplitude of the AC component on the "i" number of output terminals of the acceleration sensor (1), which corresponds to the Z axis;

$U_{yi}^0$ is the amplitude of the AC component on the "i" number of output terminals of the acceleration sensor (1), which corresponds to the Y axis in the stationary state of the device; and $U_{zi}^0$ is the amplitude of the AC component on the "i" number of output terminals of the acceleration sensor (1), which corresponds to the Z axis in the stationary state of the device.

Figure 4:
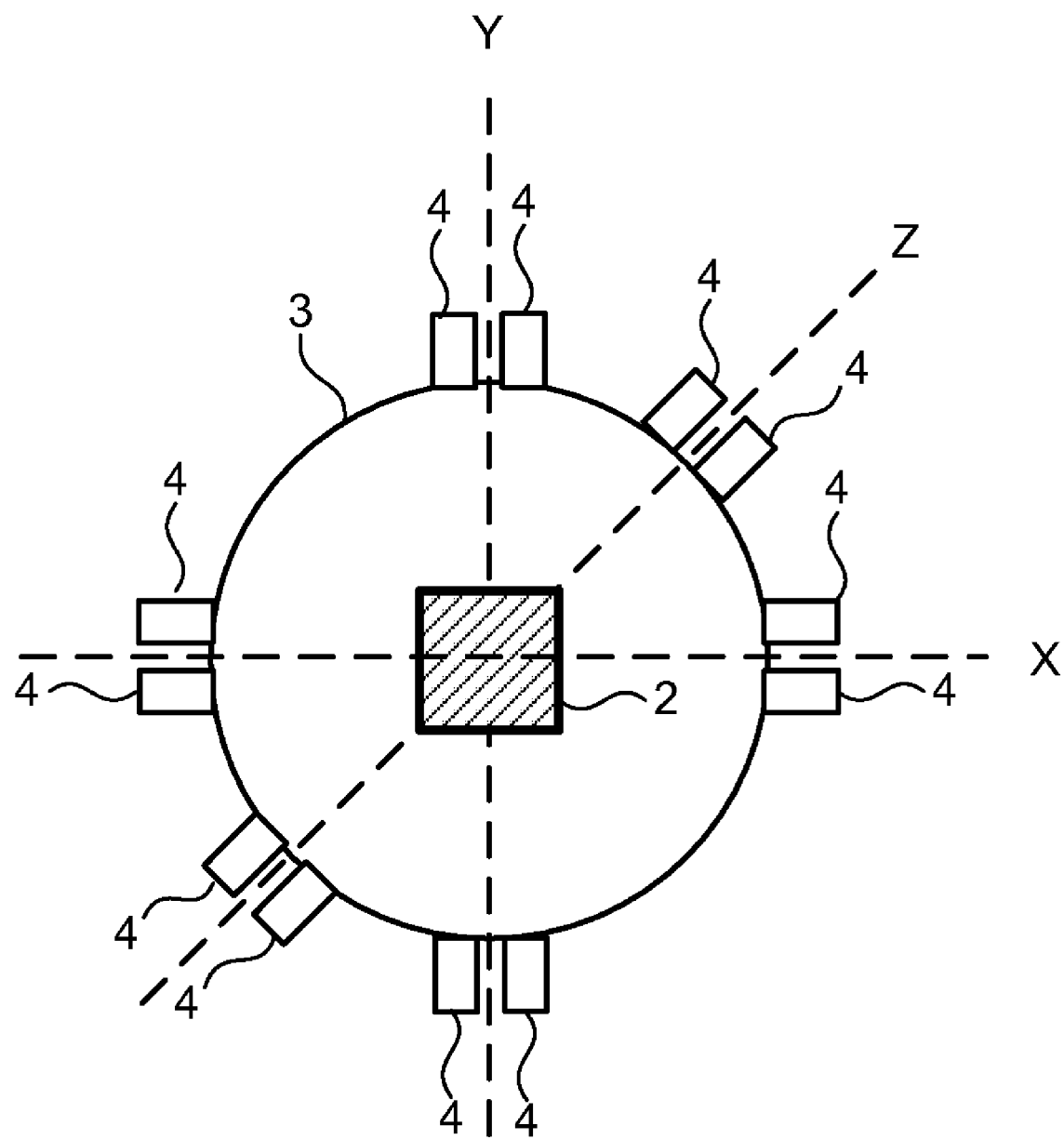
FIG. 4 is a diagrammatic view of an input device in accordance with the present invention for measurement of angular acceleration.

Acceleration components $\Psi_y$, $\Psi_z$, that are induced by the rotation of the acceleration sensor around the Y and Z axis are determined by the calculations similar to Formula 2 calculations. Linear a ={$a_x$, $a_y$, $a_z$} and angular $\Psi$={$\Psi_x$, $\Psi_y$, $\Psi_z$} acceleration components are calculated by the formulae 1 and 2, after collecting the information from every channel of the ADC (9) that are occurring according to the instructions contained in the ROM of the signal converter assembly, where temporary data and results of the calculations are contained in the RAM of the microcontroller which is a part of the counter (10). Note that to measure angular acceleration, two sensors (4) on each side are needed, to distinguish displacement due to linear acceleration from rotation of the inertial body, see FIG. 4. The sufficient size of the ROM and RAM, which simplifies the programming task with formula 1 and 2, supplements the microprocessor core HC05 used for addition, subtraction and multiplication. Real time calculation of acceleration is handled by the counter (10) with equal time slices, which are determined with a built-in multifunctional timer. Calculated components of linear and angular acceleration along with the data describing state of the switches (logical 0 may be assigned to the engaged state and logical 1 may be assigned to the disengaged switch state), are joined in the packet by the counter (10) which is transferred to the input of the serial interface 11 (which is featured in a microprocessor hardware), and where binary code is transferred into serial and added to the service data packet (synchronization and data correction and verification bytes). From the output of the serial interface (11), the data packet arrives to the input of the level converter (12), where logical 5V signals are converted according to the serial interface specifications. Through the connection cable, this information is transferred to the computer where the software driver interprets the data according to the application requirements. For example, the software package on the computer may use the devices information to control the object's position in three dimensional space where the object is moved only when the button (one of the six switches) is engaged, including the button which signals operators action. When operator presses any of the other buttons, objects may be selected, a pop-up menu may appear, etc. The total number of control switches may be up to 5.

Use of several accelerator sensors as described in the proposed device for the computer information input may be used to create a "Virtual Reality Suit," where sensors will be attached to the operator's extremities and body. It may be used for robot training, training simulators and virtual reality computer games. When additional ADC (9) channels are required, they may be obtained by either multiplexing the existing ADC channels or by connecting additional ADC chips to a signal converter assembly (5) with their digital outputs connected to the counter (10) by a bi-directional bus.

In this way the proposed device allows for independent manipulation of six degrees of freedom represented by three linear a={$a_x$, $a_y$, $a_z$} and three angular $\Psi$={$\Psi_x$, $\Psi_y$, $\Psi_z$} acceleration components. Based on the information supplied by the device software driver, the computer is able to estimate movement and absolute degrees of freedom (linear as well as angular around each of the axis X, Y, Z of a device in 3D space). The beginning of the coordinate count is started when the operator presses, holds and engages one of the switches on the device.

Reliability of the proposed computer input device is ensured by the absence of the frictioning parts or assemblies.

The device is easy to manufacture due to the absence of the precision parts in the acceleration sensor, low precision requirements to the current generator adjustments, possibility to manufacture magnetic coil by printed circuit technology, and the limited number of parts in the device.

It will be readily understood by those persons skilled in the art that the present invention is susceptible to broad utility and application. Many embodiments and adaptations of the present invention other than those herein described, as well as many variations, modifications and equivalent arrangement, will be apparent from or reasonably suggested by the present invention and the foregoing description without departing from the substance or scope of the present invention.

Accordingly, while the present invention has been described in detail in relation to its preferred embodiment, it is to be understood that this disclosure is only illustrative and exemplary of the present invention and is made merely for purposes of providing a full and enabling disclosure of the invention. The foregoing disclosure is not intended to be construed to limit the present invention or otherwise exclude any other embodiments, adaptations, variations, modifications or equivalent arrangements, the present invention being limited only by the claims and the equivalents thereof.

What is claimed is:

1. A computer input device comprising:
a magnetized fluid;
an inertial body suspended using the magnetized fluid; and
a signal converter providing at least two components of angular acceleration information based on behavior of the inertial body and based on behavior of the magnetized fluid.

2. The device of claim 1, wherein the computer input device is attached to a Virtual Reality Suite.

3. The device of claim 1, wherein the angular acceleration information is used to control computer-generated graphical objects.

4. The device of claim 1, wherein the inertial body is non-magnetic.

5. The device of claim 1, wherein the inertial body is hollow.

6. The device of claim 1, further comprising electromagnets for magnetizing the fluid.

7. The device of claim 1, further comprising permanent magnets and electromagnets for magnetizing the fluid.

8. The device of claim 1, further comprising a plurality of magnetic coils for sensing the changes in the magnetic flux lines, wherein signals from the magnetic coils are used by the signal converter to calculate the angular acceleration.

9. The device of claim 1, further comprising a housing enclosing the magnetized fluid and the inertial body.

10. A computer input device comprising:
an inertial body in contact with a fluid, wherein the fluid exerts a repulsive force on the inertial body, maintaining the inertial body approximately in place; and
a signal converter providing at least two components of angular acceleration information based on displacement of the inertial body and based on behavior of the magnetized fluid.

11. The device of claim 10, further comprising electromagnets for magnetizing the fluid.

12. The device of claim 10, further comprising permanent magnets and electromagnets for magnetizing the fluid.

13. The device of claim 10, further comprising a plurality of magnetic coils for sensing the changes in the magnetic flux lines, wherein signals from the magnetic coils are used by the signal converter to calculate the at least two components of angular acceleration.

14. The device of claim 10, further comprising a housing enclosing the magnetized fluid and the inertial body.

15. The device of claim 1, wherein the computer input device is attached to a Virtual Reality Suite.

16. The device of claim 10, wherein the at least two components of angular acceleration information is used to control computer-generated graphical objects.

17. A computer input device comprising:
a housing;
an inertial body within the housing;
a fluid acting as an elastic body and holding the inertial body in suspension; and
a signal converter providing at least two components of angular acceleration information based on behavior of the inertial body and based on magnetic behavior of the fluid.

18. A sensor comprising:
a magnetic fluid magnetized by application of magnetic fields; and
an output signal corresponding to at least two components of angular acceleration and based on behavior of the magnetic fluid.

19. The sensor of claim 18, further comprising an inertial body in contact with the magnetic fluid, wherein the inertial body disturbs the magnetic fluid in response to angular acceleration.

20. The sensor of claim 19, further comprising a housing enclosing the inertial body and the magnetic fluid.

21. The sensor of claim 18, further comprising a plurality of magnets that generate the magnetic fields.

22. The sensor of claim 18, further comprising a plurality of sensing coils that sense the behavior of the magnetic fluid.

* * * * *